US012118210B2

(12) United States Patent
Tan et al.

(10) Patent No.: US 12,118,210 B2
(45) Date of Patent: Oct. 15, 2024

(54) USING BAD BLOCKS FOR SYSTEM DATA IN MEMORY

(71) Applicant: Micron Technology, Inc., Boise, ID (US)

(72) Inventors: Kok Hua Tan, Singapore (SG); Yong Kiang Chua, Singapore (SG); Chee Hock Ngo, Singapore (SG)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/104,291

(22) Filed: Nov. 25, 2020

(65) Prior Publication Data

US 2022/0164107 A1 May 26, 2022

(51) Int. Cl.
*G06F 3/06* (2006.01)

(52) U.S. Cl.
CPC .......... *G06F 3/0604* (2013.01); *G06F 3/0619* (2013.01); *G06F 3/064* (2013.01); *G06F 3/0679* (2013.01)

(58) Field of Classification Search
USPC .......................... 711/154, 103, 173; 714/764
See application file for complete search history.

(56) References Cited

U.S. PATENT DOCUMENTS

| | | | | |
|---|---|---|---|---|
| 5,991,215 A * | 11/1999 | Brunelle | ................ | G11C 29/88 365/201 |
| 7,398,439 B2 * | 7/2008 | Kushida | ................ | G11C 29/42 714/718 |
| 10,204,040 B2 * | 2/2019 | Peddle | ................ | G06F 12/1081 |
| 10,403,379 B1 * | 9/2019 | Kuo | ........................ | G11C 29/44 |
| 2001/0028523 A1 * | 10/2001 | Moro | ................ | G06F 11/1068 714/E11.038 |
| 2003/0221144 A1 * | 11/2003 | Shimada | ................ | G11C 29/56 714/710 |
| 2012/0260149 A1 * | 10/2012 | Chang | ................... | H03M 13/13 714/763 |
| 2012/0272107 A1 * | 10/2012 | Cadloni | ................ | G06F 3/0679 714/E11.02 |
| 2013/0044542 A1 * | 2/2013 | Huang | ................... | G11C 16/10 365/185.03 |
| 2013/0254463 A1 * | 9/2013 | Matsunaga | ........... | G06F 11/106 711/103 |
| 2013/0290609 A1 * | 10/2013 | Lee | ..................... | G06F 16/1727 711/E12.008 |
| 2013/0332644 A1 * | 12/2013 | Chan | ...................... | G11C 16/20 711/E12.008 |
| 2014/0056052 A1 * | 2/2014 | Lee | ..................... | G11C 13/0033 365/158 |
| 2016/0019111 A1 * | 1/2016 | Kochar | ............... | G06F 11/0751 714/6.12 |
| 2016/0378976 A1 * | 12/2016 | Kotary | .................. | G06F 3/0655 713/193 |
| 2018/0254092 A1 * | 9/2018 | Liu | ....................... | G11C 29/838 |

(Continued)

*Primary Examiner* — Yaima Rigol
*Assistant Examiner* — Elias Kim
(74) *Attorney, Agent, or Firm* — Brooks, Cameron & Huebsch, PLLC (57) ABSTRACT

A memory component has a block of memory cells that has been designated as a bad block. A processing device included in the memory component identifies a functional page of memory cells in the bad block, and programs system data to the identified functional page of memory cells in the bad block.

17 Claims, 6 Drawing Sheets

(56) References Cited

U.S. PATENT DOCUMENTS

2019/0310923 A1* 10/2019 Jun .................... G06F 11/1666
2019/0371409 A1    12/2019 Brandt et al.
2021/0072896 A1*  3/2021 Byun ................... G11C 29/24
2022/0269409 A1*  8/2022 Zeng ................... G06F 3/0679

* cited by examiner

USING BAD BLOCKS FOR SYSTEM DATA IN MEMORY

TECHNICAL FIELD

Embodiments of the disclosure relate generally to memory sub-systems, and more specifically, relate to using bad blocks for system data in memory.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to using bad blocks for system data in memory. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

The data stored at a memory sub-system can include, for example, user data (e.g., data programmed to and sensed from the memory sub-system during operation of the memory sub-system) and system data (e.g., data associated with, and/or programmed to the memory sub-system during, manufacture of the memory sub-system). A conventional memory sub-system can store the user data in a high-performance, high-reliability portion (e.g., blocks) of the memory sub-system designated as user blocks, and can store the system data in another, lower-performance, lower-reliability portion of the memory sub-system designated as a file system area. However, the lower-performance, lower-reliability file system area can be susceptible to being erased, which can result in the system data stored therein being lost.

To prevent such a system data loss, the system data can instead be stored in the high-performance, high-reliability user blocks. However, doing so can reduce the amount of the user blocks that would be available to store the user data, which can decrease the performance and/or reliability of the memory sub-system.

Aspects of the present disclosure address the above and other deficiencies by storing the system data in user blocks of the memory sub-system that have been designated (e.g., marked during manufacturing) as bad blocks. As used herein, a "bad block" can include and/or refer to an area of storage media that is not reliable for storing and/or retrieving data (e.g. user data) because it is physically damaged or corrupted. In many instances, however, there may be a certain amount (e.g., 17-20%) of pages of memory cells in a bad block that can still retain enough functionality to reliably store system data, even though the block as a whole may not be reliable enough to store user data. Accordingly, the system data can be stored in these pages of the bad block, thereby making the system data less likely to be lost that if it were stored in the lower-performance, lower-reliability file system area. At the same time, storing the system data in these pages of the bad block would not reduce the amount of user blocks available for user data, and therefore would not decrease the performance and/or reliability of the memory sub-system, since no user data would otherwise be stored in a block designated as a bad block.

Figure 1:
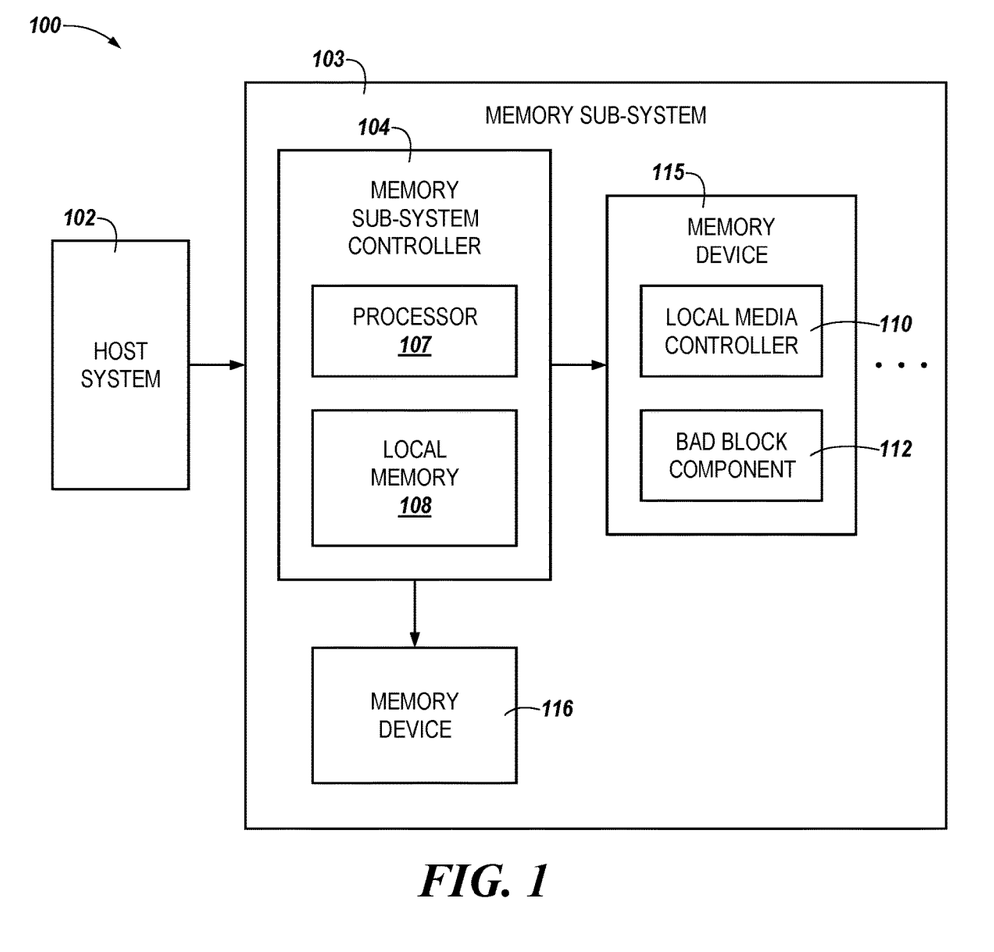
FIG. 1 illustrates an example computing environment that includes a memory sub-system in accordance with some embodiments of the present disclosure.

FIG. 1 illustrates an example computing environment 100 that includes a memory sub-system 103 in accordance with some embodiments of the present disclosure. The memory sub-system 103 can include media, such as one or more volatile memory devices (e.g., memory device 116), one or more non-volatile memory devices (e.g., memory device 115), or a combination of such.

A memory sub-system 103 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing environment 100 can include a host system 102 that is coupled to one or more memory sub-systems 103. In some embodiments, the host system 102 is coupled to different types of memory sub-system 103. FIG. 1 illustrates one example of a host system 102 coupled to one memory sub-system 103. The host system 102 uses the memory sub-system 103, for example, to write data to the memory sub-system 103 and read data from the memory sub-system 103. As used herein, "coupled to" generally refers to a connection between components, which can be an indirect communicative connection or direct communicative connection (e.g., without intervening components), whether wired or wireless, including connections such as electrical, optical, magnetic, etc.

The host system 102 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes a memory and a processing device. The host system 102 can be coupled to the memory sub-system 103 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 102 and the memory sub-system 103. The host system 102 can further utilize an NVM Express (NVMe) interface to access the memory components (e.g., memory devices 115) when the memory sub-system 103 is coupled with the host system 102 by the PCIe interface. The physical host interface can provide an interface for passing control, address, data, and other signals between the memory sub-system 103 and the host system 102.

The memory devices can include any combination of the different types of non-volatile memory devices and/or volatile memory devices. The volatile memory devices (e.g., memory device 116) can be, but are not limited to, random access memory (RAM), such as dynamic random access memory (DRAM) and synchronous dynamic random access memory (SDRAM).

An example of non-volatile memory devices (e.g., memory device 115) includes a negative-and (NAND) type flash memory. Each of the memory devices 115 can include one or more arrays of memory cells. The memory cells can include single level cells (SLCs) that can store one bit per cell, multi-level cells (MLCs) that can store two bits per cell, triple level cells (TLCs) that can store three bits per cell, quad-level cells (QLCs) that can store four bits per cell, and/or penta-level cells (PLCs) that can store five bits per cell, among others. As used herein, the term multiple level cells is used to refer to cells configured to store more than one bit per cell (e.g., MLC, TLC, QLC, PLC, etc.). In some embodiments, a particular memory component can include an SLC portion, and an MLC portion, a TLC portion, a QLC portion, and/or a PLC portion of memory cells. Each of the memory cells can store one or more bits of data used by the host system 102. Furthermore, the memory cells of the memory devices 115 can be grouped as memory pages or memory blocks that can refer to a unit of the memory component used to store data. An example of such a grouping will be further described herein (e.g., in connection with FIG. 5).

Although non-volatile memory components such as NAND type flash memory are described, the memory device 115 can be based on any other type of non-volatile memory, such as read-only memory (ROM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 104 can communicate with the memory devices 115 to perform operations such as reading data, writing data, or erasing data at the memory devices 115 and other such operations. The memory sub-system controller 104 can include hardware such as one or more integrated circuits and/or discrete components, a buffer memory, or a combination thereof. The memory sub-system controller 104 can be a microcontroller, special purpose logic circuitry (e.g., a field programmable gate array (FPGA), an application specific integrated circuit (ASIC), etc.), or other suitable processor.

The memory sub-system controller 104 can be a processing device, which includes one or more processors (e.g., processor 107) configured to execute instructions stored in a local memory 108. In the illustrated example, the local memory 108 of the memory sub-system controller 104 includes an embedded memory configured to store instructions for performing various processes, operations, logic flows, and routines that control operation of the memory sub-system 103, including handling communications between the memory sub-system 103 and the host system 102.

In some embodiments, the local memory 108 can include memory registers storing memory pointers, fetched data, etc. The local memory 108 can also include read-only memory (ROM) for storing micro-code. While the example memory sub-system 103 in FIG. 1 has been illustrated as including the memory sub-system controller 104, in another embodiment of the present disclosure, a memory sub-system 103 does not include a memory sub-system controller 104, and can instead rely upon external control (e.g., provided by an external host, or by a processor or controller separate from the memory sub-system).

In general, the memory sub-system controller 104 can receive commands or operations from the host system 102 and can convert the commands or operations into instructions or appropriate commands to achieve the desired access to the memory devices 115. The memory sub-system controller 104 can be responsible for other operations such as wear leveling operations, garbage collection operations, error detection and error-correcting code (ECC) operations, encryption operations, caching operations, and address translations between a logical block address and a physical block address that are associated with the memory devices 115. The memory sub-system controller 104 can further include host interface circuitry to communicate with the host system 102 via the physical host interface. The host interface circuitry can convert the commands received from the host system into command instructions to access the memory devices 115 as well as convert responses associated with the memory devices 115 into information for the host system 102.

The memory sub-system 103 can also include additional circuitry or components that are not illustrated. In some embodiments, the memory sub-system 103 can include a cache or buffer (e.g., DRAM) and address circuitry (e.g., a row decoder and a column decoder) that can receive an address from the memory sub-system controller 104 and decode the address to access the memory devices 115.

In some embodiments, the memory devices 115 include local media controllers 110 that operate in conjunction with memory sub-system controller 104 to execute operations on one or more memory cells of the memory devices 115.

The memory sub-system includes a bad block component 112 that can use bad blocks of memory device 115 to store system data. In some embodiments, the memory device 115 includes at least a portion of the bad block component 112.

In some embodiments, the memory sub-system controller 104 can include a processor 107 (processing device) configured to execute instructions stored in local memory 108 for performing the operations described herein. In some embodiments, the bad block component 112 is part of the host system 102, an application, or an operating system.

For example, memory device 115 can include a number of blocks of memory cells designated (e.g., marked during manufacture of memory device 115) as bad blocks. As used herein, a "bad block" can include and/or refer to an area of storage media (e.g., memory device 115) that is not reliable for storing and/or retrieving data (e.g. user data) because it is physically damaged or corrupted (e.g., during manufacturing). In many instances, however, there may be a certain amount (e.g., 17-20%) of pages of memory cells in the bad block that can still retain enough functionality (e.g., on which write, erase, and/or read operations can still be successfully performed) to reliably store and/or retrieve system data, even though the block as a whole may not be reliable enough to store and/or retrieve user data.

Accordingly, bad block component 112 can identify such a functional page of memory cells in one of the bad blocks, and program (e.g., write) system data to the identified functional page of memory cells in the bad block. As used herein, "system data" can include and/or refer to any type of data other than user data. For example, the system data can be and/or include manufacturing data associated with memory sub-system 103, such as, for instance, a manufacturing identification (MID), a serial number, a defect list, and/or calibration data, among other types of manufacturing data. In contrast, the user data can include data programmed to and/or sensed from memory device 115 during operation of memory sub-system 103. For instance, controller 104 can program such user data to, and/or sense such user data from, the other (e.g., good) blocks of memory cells of memory device 115 that have not been designated as bad blocks. Bad block component 112 can further incorporate error correction code, such as, for instance, cyclic redundancy check (CRC) code and/or low density parity check (LDPC) code, in the system data programmed to the identified functional page in the bad block in order to improve the integrity of (e.g., provide protection for) the programmed system data.

Bad block component 112 can identify the functional page of memory cells in the bad block by, for example, programming placeholder data to a page of memory cells in the bad block, sensing the placeholder data, performing an error detection operation on the sensed placeholder data to determine whether there are any errors (e.g. bit flips) in the sensed placeholder data, and identifying the page as a functional page responsive to the error detection operation determining there are no errors in the sensed placeholder data (e.g., the page is not identified as a functional page, and/or is identified as a non-functional page, responsive to the error detection operation determining there is an error in the sensed placeholder data). Bad block component 112 can further identify the functional page by, responsive to the error detection operation determining there are no errors in the sensed placeholder data, erasing the placeholder data from the page and programming additional placeholder data that is opposite (e.g., flipped from) the placeholder data to page, sensing the additional placeholder data, performing an additional error detection operation on the sensed additional placeholder data to determine whether there are any errors in the sensed additional placeholder data, and identifying the page as a functional page responsive to the additional error detection operation determining there are no errors in the sensed additional placeholder data (e.g., the page is not identified as a functional page, and/or is identified as a non-functional page, responsive to the additional error detection operation determining there is an error in the sensed additional placeholder data). The identification of a page of memory cells in a bad block as a functional page will be further described herein (e.g., in connection with FIG. 3).

Bad block component 112 can further identify a number of additional functional pages of memory cells in the bad block in an analogous manner, and program the system data (e.g., copies of the system data) to the identified additional functional pages. For instance, bad block component 112 can, in an analogous manner, identify functional pages of memory cells in the bad block by programming the placeholder data and/or the additional (e.g., opposite) placeholder data to each respective page of memory cells in the bad block, sensing the placeholder data and/or the additional placeholder data, performing the error detection operations to determine whether there are any errors in the sensed placeholder data and/or sensed additional placeholder data, and identifying the page as a functional page responsive to the error detection operations determining there are no errors in the sensed placeholder data and/or the sensed additional placeholder data, until a particular number of pages have been identified as functional, until a particular number of pages have been identified as non-functional, or until the end of the bad block has been reached, as will be further described herein (e.g., in connection with FIG. 3).

As an example, bad block component 112 can identify eight total functional pages of memory cells in the bad block, and program the system data to four of the eight identified functional pages such that four copies of the system data get programmed to four different functional pages of the bad block. However, embodiments of the present disclosure are not limited to a particular number of functional (or non-functional) pages that can be identified in the bad block, or to a particular number of copies of the system data that can be programmed to the bad block.

Figure 3:
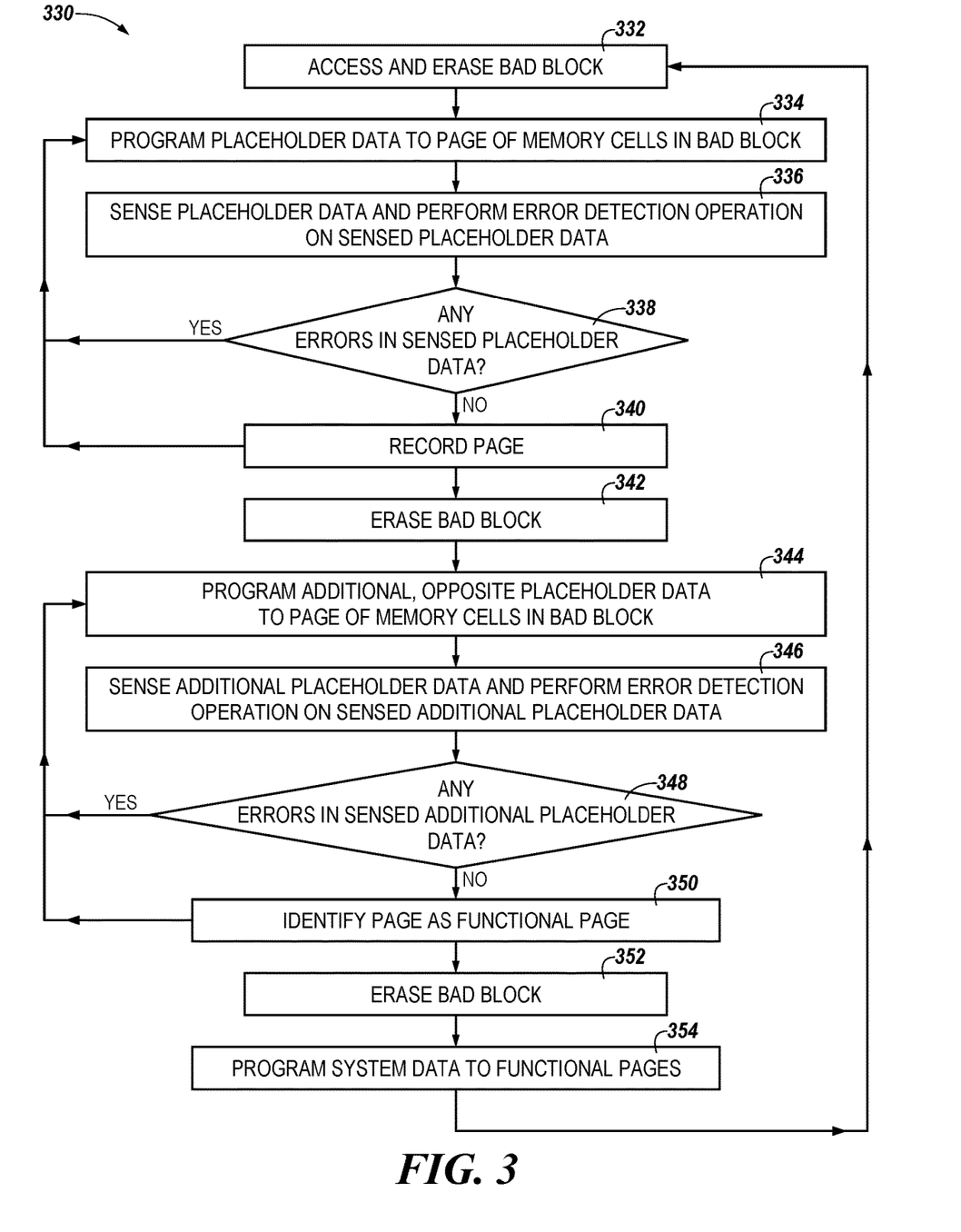
FIG. 3 is a flow diagram of an example method to identify, and program system data to, functional pages of memory cells in bad blocks in accordance with some embodiments of the present disclosure.

If the end of the bad block has been reached, or if a particular number pages have not been identified as functional and/or a particular number of copies of the system data have not been programmed to the bad block, bad block component 112 can further identify, in an analogous manner, a functional page(s) of memory cells in an additional one of the bad blocks, and program the system data (e.g., copies of the system data) to the identified functional page(s) of the additional bad block, as will be further described herein (e.g., in connection with FIG. 3).

After the system data has been programmed to the identified functional page(s) of the bad block(s), bad block component 112 can locate the functional page(s) in the bad block(s) to which the system data has been programmed (e.g., the functional page(s) having the system data stored therein), and sense the system data from the functional page(s) upon locating the functional page(s). For instance, bad block component 112 can locate the functional page(s) and sense the system data from the functional page(s) responsive to receiving a command from host system 102 to retrieve the system data. Further, bad block component 112 can perform an error correction operation on the sensed system data using the error correction code incorporated in the system data. For instance, bad block component 112 can perform a CRC operation using the CRC code incorporated in the system data, and/or can perform an LDPC operation using the LDPC code incorporated in the system data.

Bad block component 112 can locate a functional page of memory cells having the system data stored therein in a bad block by, for example, scanning the bad block (e.g., sensing the pages of the bad block) for a signature associated with the system data. Once the signature had been found, bad block component 112 can sense the system data from the located functional page (e.g., from the page(s) that have the signature), and perform the error correction operation on the sensed system data. The locating of a functional page will be further described herein (e.g., in connection with FIG. 4).

Bad block component 112 can further locate a number of additional functional pages of memory cells having the system data stored therein in the bad block, sense the system data from the located additional functional pages, and perform the error correction operation on the additional sensed system data in an analogous manner. For instance, bad block component 112 can scan each respective page of memory cells in the bad block for the signature associated with the system data, sense the system data from the page(s) that have the signature, and perform the error correction operation on the sensed system data, until a particular number of pages having the signature have been located and the particular number of copies of the system data have been sensed, or until the end of the block has been reached, as will be further described herein (e.g., in connection with FIG. 4).

As an example, bad block component 112 can scan the pages of memory cells in the bad block for the signature, sense the system data from the pages that have the signature, and perform the error correction operation on the sensed system data, until four pages of memory cells having the signature have been located and four copies of the system data have been sensed. However, embodiments of the present disclosure are not limited to this example.

If the end of the bad block has been reached, or if a particular number pages having the signature have not been located and/or a particular number of copies of the system data have not been sensed, bad block component 112 can further, in an analogous manner, locate functional page(s) of memory cells to which the system data has been programmed in an additional bad block, sense the system data from the functional page(s) upon locating the functional page(s) in the additional bad block, and perform an error correction operation on the sensed system data, as will be further described herein (e.g., in connection with FIG. 3).

Figure 2:
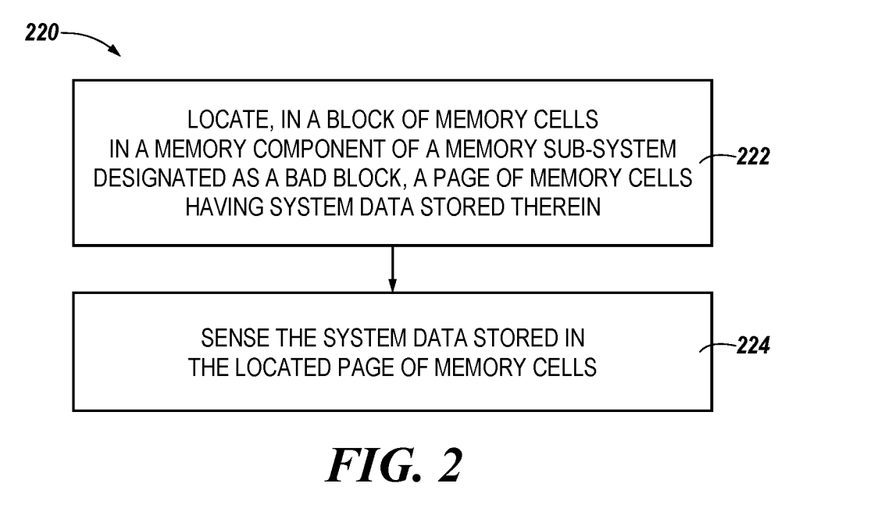
FIG. 2 is a flow diagram of an example method to use bad blocks for system data in accordance with some embodiments of the present disclosure.

FIG. 2 is a flow diagram of an example method 220 to use bad blocks for system data in accordance with some embodiments of the present disclosure. The method 220 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 220 is performed by bad block component 112 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 222, the processing device locates, in a block of memory cells in a memory component of a memory sub-system designated as a bad block, a page of memory cells having system data stored therein. The memory component and memory sub-system can be, for example, memory device 115 and memory sub-system 103, respectively, of FIG. 1. The system data can include, for example, manufacturing data associated with the memory sub-system, and the bad block can be one of a number of bad blocks designated as bad blocks during manufacture of the memory component, as previously described herein.

The page of memory cells having the system data stored therein can be located in the bad block by, for example, scanning the bad block for a signature associated with the system data, as previously described herein. This page can be a page that was previously identified as a functional page of memory cells in the bad block, as previously described herein.

At operation 224, the processing device senses the system data stored in the located page of memory cells. Although not shown in FIG. 2, an error correction operation can be performed on the sensed data, as previously described herein.

FIG. 3 is a flow diagram of an example method 330 to identify, and program system data to, functional pages of memory cells in bad blocks in accordance with some embodiments of the present disclosure. The method 330 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 330 is performed by bad block component 112 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 332, a bad block is accessed and erased. The bad block can be one of a number of bad blocks designated as bad blocks during manufacture of a memory component (e.g., memory device 115), as previously described herein. The number of bad blocks can be the bad blocks of a particular die of the memory component, such as, for instance, a particular logical unit (LUN) of the memory component.

At operation 334, placeholder data is programmed to a (e.g., the first) page of memory cells in the bad block. The placeholder data can be represented as, for example, 0xA5A5A5A5. However, embodiments are not so limited.

At operation 336, the placeholder data is sensed, and an error detection operation is performed on the sensed placeholder data. If it is determined at operation 338 that there are any errors (e.g., bit flips) in the sensed placeholder data, method 330 returns to operation 334, and the placeholder data is programmed to the next page of memory cells in the bad block. If it is determined at operation 338 that are no errors (e.g., zero bit flips) in the sensed placeholder data, the page of memory cells is recorded at operation 340. Method 330 then returns to operation 334, and the placeholder data is programmed to the next page of memory cells in the bad block.

Operations 334, 336, 338, and 340 can be repeated until the placeholder data has been programmed to and sensed from all pages of memory cells in the bad block. Method 330 can then proceed to operation 342. However, if no pages were recorded at operation 340 (e.g., if there were no pages of the bad block whose sensed placeholder data had no errors), method 330 can return to operation 332, and the next bad block of the die can be accessed and erased. Further, in some examples, operations 334, 336, 338, and 340 may not be repeated for all the pages of memory cells in the bad block if a particular number of pages of the bad block are, or are not, recorded at operation 340 (e.g., determined to have no errors). For example, if each of the first 256 pages of the bad block are recorded at operation 340 (e.g., if the sensed placeholder data of each of the first 256 pages of the bad block is determined to have no errors), method 330 can proceed to operation 342 (e.g., without repeating operations 334, 336, 338, and 340 for the remaining pages of the bad block). If, however, none of the first 256 pages of the bad block are recorded at operation 340 (e.g., if the sensed placeholder data of each of the first 256 pages of the bad block is determined to have errors), method 330 can return to operation 332 (e.g., without repeating operations 334, 336, 338, an 340 for the remaining pages of the bad block). Embodiments are not limited to this example, however.

At operation 342, the bad block is erased. At operation 344, additional placeholder data is programmed to a (e.g., the first) page of memory cells in the bad block that was recorded at operation 340. The additional placeholder data is opposite (e.g., flipped from) the placeholder data programmed to the page at operation 334. For example, the additional placeholder data can be represented as 0x5A5A5A5A. However, embodiments are not so limited.

At operation 346, the additional placeholder data is sensed, and an error detection operation is performed on the sensed additional placeholder data. If it is determined at operation 348 that there are any errors (e.g., bit flips) in the sensed additional placeholder data, method 330 returns to operation 344, and the additional placeholder data is programmed to the next page of memory cells in the bad block that was recorded at operation 340. If it is determined at operation 348 that are no errors (e.g., zero bit flips) in the sensed additional placeholder data, the page of memory cells is identified as a functional (e.g., good) page at operation 350. Method 330 then returns to operation 344, and the additional placeholder data is programmed to the next page of memory cells in the bad block that was recorded at operation 340.

Operations 344, 346, 348, and 350 can be repeated until the additional placeholder data has been programmed to and sensed from all the pages of memory cells in the bad block that were recorded at operation 340. Method 330 can then proceed to operation 352. However, if no pages are identified as functional at operation 350 (e.g., if there were no pages of the bad block whose sensed additional placeholder data had no errors), method 330 can return to operation 332, and the next bad block of the die can be accessed and erased. Further, in some examples, operations 344, 346, 348, and 350 may not be repeated for all the recorded pages of memory cells in the bad block if a particular number of the recorded pages are identified as functional at operation 350 (e.g., determined to have no errors). For example, once eight of the recorded pages of the bad block are identified as functional at operation 350 (e.g., if the sensed additional placeholder data of eight different recorded pages of the bad block is determined to have no errors), method 330 can proceed to operation 352 (e.g., without repeating operations 344, 346, 348, and 350 for the remaining recorded pages of the bad block). Embodiments are not limited to this example, however.

At operation 352, the bad block is erased. At operation 354, the system data is programmed to the pages of memory cells identified as functional at operation 350. For example, the system data can be programmed to a particular number of the pages identified as functional. For instance, the system data can be programmed to four of the identified functional pages (e.g., four copies of the system data can be made). Embodiments are not limited to this example, however. Further, although not shown in FIG. 3, error correction code, such as, for instance, CRC code and/or LDPC code, can be incorporated in the system data programmed to the identified functional pages in order to improve the integrity of (e.g., provide protection for) the programmed system data.

If the system data is not able to be programmed to the particular number of pages (e.g., if less than the particular number of pages have been identified as functional), method 330 can return to operation 332, and the next bad block of the die can be accessed and erased. If the system data is programmed to the particular number of pages (e.g., if the particular number of copies of the system data is able to be made), method 330 can be repeated for the next die (e.g., the next LUN) of the memory component.

Figure 4:
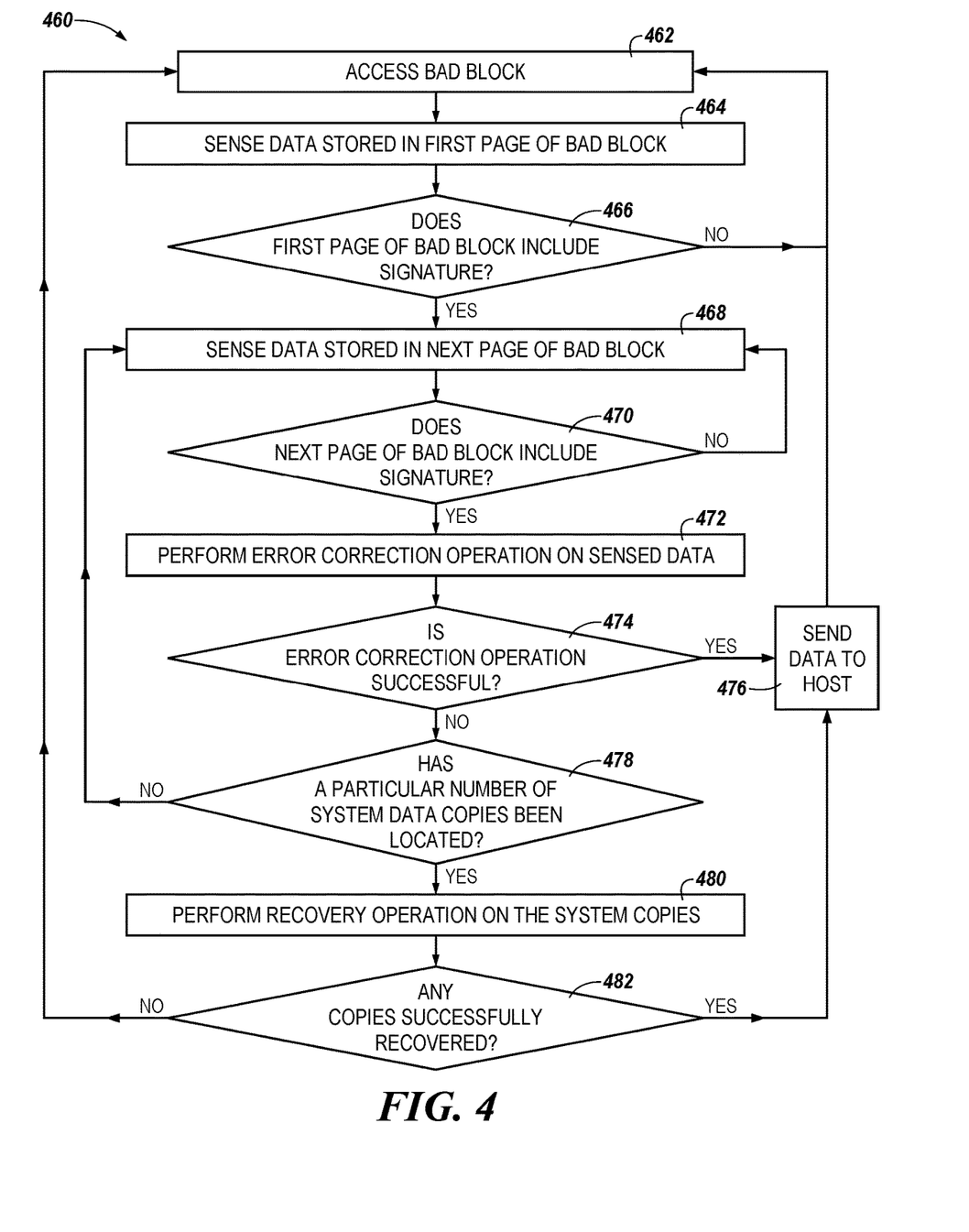
FIG. 4 is a flow diagram of an example method to locate pages of memory cells in bad blocks having system data stored therein, and sense the system data therefrom, in accordance with some embodiments of the present disclosure.

FIG. 4 is a flow diagram of an example method 460 to locate pages of memory cells in bad blocks having system data stored therein, and sense the system data therefrom, in accordance with some embodiments of the present disclosure. The method 460 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 460 is performed by bad block component 112 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 462, a bad block is accessed. The bad block can be one (e.g., the first) of a number of bad blocks designated as bad blocks during manufacture of a memory component (e.g., memory device 115), as previously described herein. The number of bad blocks can be the bad blocks of a particular die of the memory component, such as, for instance, a particular logical unit (LUN) of the memory component.

At operation 464, the data stored in the first page of the bad block is sensed, and it is determined whether this sensed data includes a signature associated with the system data at operation 466. The signature can be represented as, for example, 0xABCDDDEE. However, embodiments are not so limited.

If it is determined that the sensed data from the first page does not include the signature, this can indicate that the bad block has no system data stored therein. Accordingly, method 460 returns to operation 462, and the next bad block of the die is accessed; if the bad block is the last bad block of the die, then the first bad block of the next die (e.g., the next LUN) of the memory component is accessed. If it is determined that the sensed data from the first page includes the signature, this can indicate that the bad block has the system data stored therein, and accordingly method 460 proceeds to operation 468.

At operation 468, the data stored in the next page of the bad block is sensed, and it is determined whether this sensed data includes the signature associated with the system data at operation 470. If it is determined that the sensed data from this page does not include the signature, this can indicate that this page of the bad block has no system data stored therein. Accordingly, method 460 returns to operation 468, and the data stored in the next page of the bad block is sensed; if this page of the bad block is the last page of the bad block, then method 460 can return to operation 462, and the next bad block of the die is accessed. If it is determined that the sensed data from this page includes the signature, this can indicate that this page of the bad block has the system data stored therein (e.g., that the sensed data from this page includes the system data), and accordingly method 460 proceeds to operation 468.

At operation 472, an error correction operation is performed on the sensed data (e.g., on the sensed system data stored in the page). The error correction operation can be performed, for example, using error correction code incorporated in the system data, such as, for instance, the error correction code incorporated in the system data when the system data was programmed to the page, as previously described herein.

At operation 474, it is determined whether the error correction performed on the sensed data at operation 472 is successful (e.g., whether the errors in the sensed data were able to be successfully corrected by the error correction operation). If the error correction operation is successful, the corrected data (e.g., the system data) is sent to a host (e.g., host system 102 previously described in connection with FIG. 1) at operation 476. Further, although not shown in FIG. 4, the corrected data (e.g., the system data) can be restored to the memory component. Method 460 can then return to operation 462, and the next bad block of the die is accessed. If the error correction is not successful, method 460 proceeds to operation 478.

At operation 478, it is determined whether a particular number of copies of the system data have been located (e.g., whether a particular number of pages having the system data stored therein have been found). The particular number can be, for instance, four (e.g., it can be determined whether four copies of the system data have been located). However, embodiments are not so limited.

If the particular number of system data copies have not been located, method 460 returns to operation 468, and the data stored in the next page of the bad block is sensed. If the particular number of system copies have been located, a data recovery operation is performed on the copies of the system data (e.g., to recover the corrupted copies of the system data that were not able to be successfully corrected by the error correction operation) at operation 480. Method 460 then proceeds to operation 482.

At operation 482, it is determined whether any copies of the system data have been successfully recovered by the data recovery operation. If no system data copies have been successfully recovered, method 460 returns to operation 462, and the next bad block of the die is accessed. If any system data copies have been successfully recovered, that copy (or copies) is sent to the host at operation 476. Further, although not shown in FIG. 4, the recovered system data copy (or copies) can be restored to the memory component. Method 460 then returns to operation 462, and the next bad block of the die is accessed. If the bad block is the last bad block of the die, then method 460 is repeated for the next die of the memory component (e.g., the first bad block of the next die of the memory component is accessed).

Figure 5:
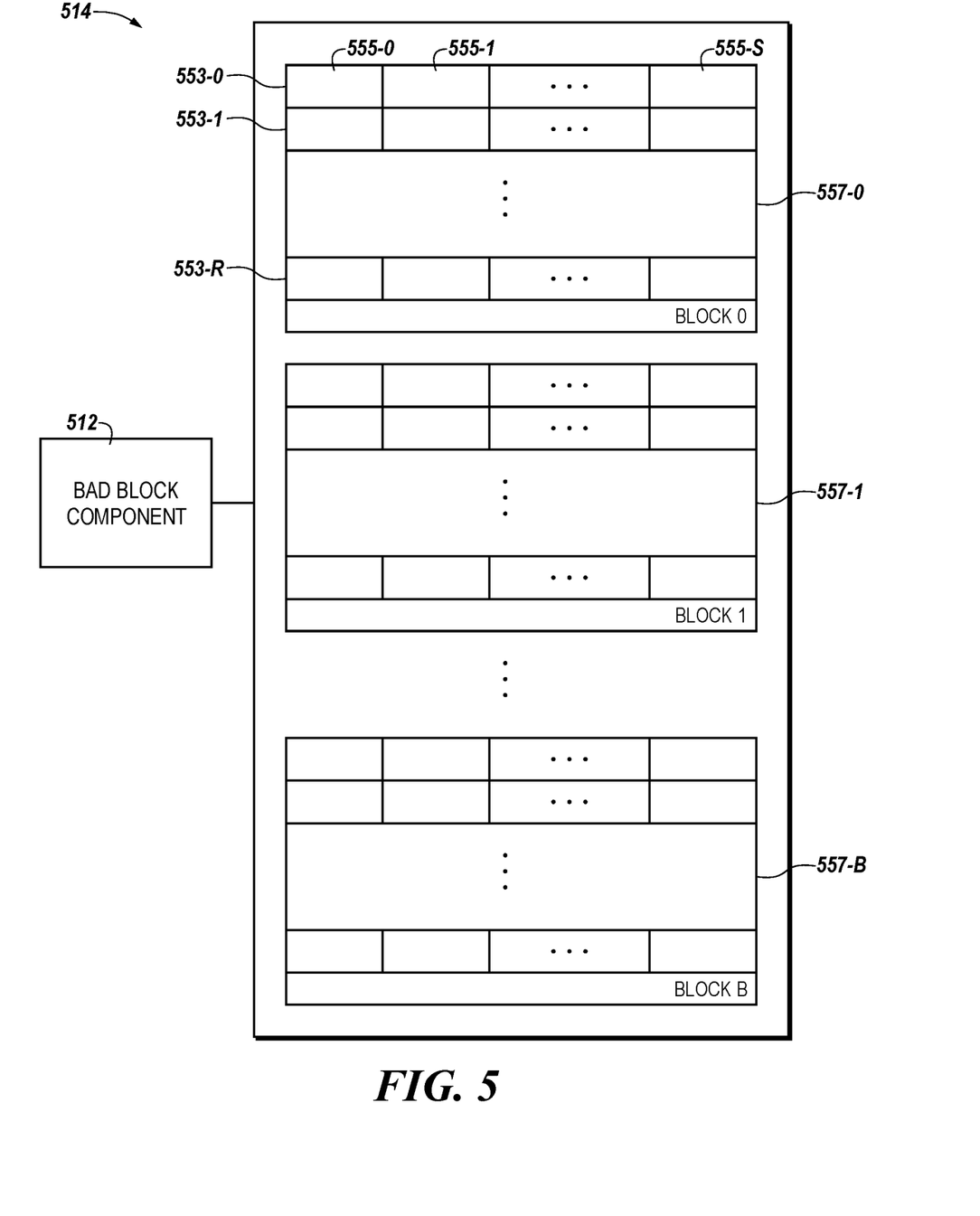
FIG. 5 illustrates a diagram of a portion of a memory array having a number of physical blocks in accordance with some embodiments of the present disclosure.

FIG. 5 illustrates a diagram of a portion of a memory array 514 having a number of physical blocks and coupled to a bad block component 512 in accordance with some embodiments of the present disclosure. The bad block component 512 can be analogous to bad block component 112 described in connection with FIG. 1. As described herein, the bad block component 512, in some embodiments, can perform actions to use bad blocks of memory array 514 to store system data.

Memory array 514 can be, for example, a NAND flash memory array. As an additional example, memory array 514 can be a storage class memory (SCM) array, such as, for instance, a three-dimensional cross-point memory array, a ferroelectric RAM (FRAM) array, or a resistance variable memory array such as a PCRAM, RRAM, or spin torque transfer (STT) array, among others. Further, although not shown in FIG. 5, memory array 514 can be located on a particular semiconductor die along with various peripheral circuitry associated with the operation thereof.

As shown in FIG. 5, memory array 514 has a number of physical blocks 557-0 (BLOCK 0), 557-1 (BLOCK 1), . . . , 557-B (BLOCK B) of memory cells. The memory cells can be operated and/or programmed according to a particular programming characteristic (e.g., programming mode) as single level cells and/or multilevel cells such as, for instance, two level cells, triple level cells (TLCs) or quadruple level cells (QLCs), and/or penta-level cells (PLC). As an example, the number of physical blocks in memory array 514 can be 128 blocks, 512 blocks, or 1,024 blocks, but embodiments are not limited to a particular power of two or to any particular number of physical blocks in memory array 514.

A number of physical blocks of memory cells (e.g., blocks 557-0, 557-1, . . . , 557-B) can be included in a plane of memory cells, and a number of planes of memory cells can be included on a die. For instance, in the example shown in FIG. 5, each physical block 557-0, 557-1, . . . , 557-B can be part of a single die. That is, the portion of memory array 514 illustrated in FIG. 5 can be a die of memory cells.

As shown in FIG. 5, each physical block 557-0, 557-1, . . . , 557-B includes a number of physical rows (e.g., 553-0, 553-1, . . . , 553-R) of memory cells coupled to access lines (e.g., word lines). The number of rows (e.g., word lines) in each physical block can be 32, but embodiments are not limited to a particular number of rows 553-0, 553-1, . . . , 553-R per physical block. Further, although not shown in FIG. 5, the memory cells can be coupled to sense lines (e.g., data lines and/or digit lines).

As one of ordinary skill in the art will appreciate, each row 553-0, 553-1, . . . , 553-R can include a number of pages of memory cells (e.g., physical pages). A physical page refers to a unit of programming and/or sensing (e.g., a number of memory cells that are programmed and/or sensed together as a functional group). In the embodiment shown in FIG. 5, each row 553-0, 553-1, . . . , 553-R comprises one physical page of memory cells. However, embodiments of the present disclosure are not so limited. For instance, in an embodiment, each row can comprise multiple physical pages of memory cells (e.g., one or more even pages of memory cells coupled to even-numbered bit lines, and one or more odd pages of memory cells coupled to odd numbered bit lines). Additionally, for embodiments including multilevel cells, a physical page of memory cells can store multiple pages (e.g., logical pages) of data (e.g., an upper page of data and a lower page of data, with each cell in a physical page storing one or more bits towards an upper page of data and one or more bits towards a lower page of data).

As shown in FIG. 5, a page of memory cells can comprise a number of physical sectors 555-0, 555-1, . . . , 555-S (e.g., subsets of memory cells). Each physical sector 555-0, 555-1, . . . , 555-S of cells can store a number of logical sectors of data. Additionally, each logical sector of data can correspond to a portion of a particular page of data. As an example, one logical sector of data stored in a particular physical sector can correspond to a logical sector corresponding to one page of data, and the other logical sector of data stored in the particular physical sector can correspond to the other page of data. Each physical sector 555-0, 555-1, . . . , 555-S, can store system and/or user data, and/or can include overhead data, such as error correction code (ECC) data, logical block address (LBA) data, and metadata.

Logical block addressing is a scheme that can be used by a host for identifying a logical sector of data. For example, each logical sector can correspond to a unique logical block address (LBA). Additionally, an LBA can also correspond (e.g., dynamically map) to a physical address, such as a physical block address (PBA), that can indicate the physical location of that logical sector of data in the memory. A logical sector of data can be a number of bytes of data (e.g., 256 bytes, 512 bytes, 1,024 bytes, or 4,096 bytes). However, embodiments are not limited to these examples.

It is noted that other configurations for the physical blocks 557-0, 557-1, . . . , 557-B, rows 553-0, 553-1, . . . , 553-R, sectors 555-0, 555-1, . . . , 555-S, and pages are possible. For example, rows 553-0, 553-1, . . . , 553-R of physical blocks 557-0, 557-1, . . . , 557-B can each store data corresponding to a single logical sector which can include, for example, more or less than 512 bytes of data. Further, memory array 514 can be partitioned using addresses to delineate pages, blocks, etc.

Figure 6:
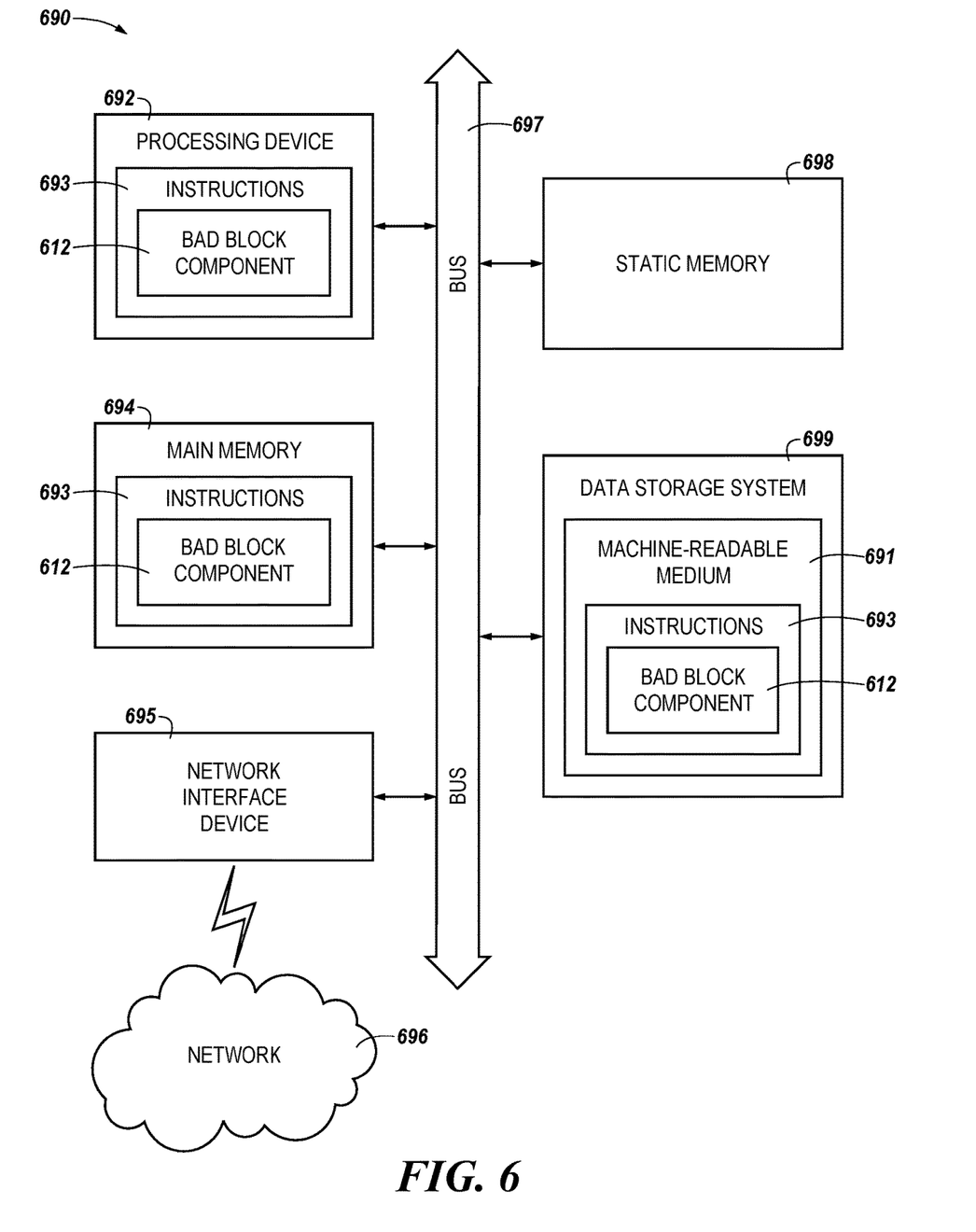
FIG. 6 is a block diagram of an example computer system in which embodiments of the present disclosure may operate.

FIG. 6 illustrates an example machine of a computer system 690 within which a set of instructions, for causing the machine to perform any one or more of the methodologies discussed herein, can be executed. In some embodiments, the computer system 690 can correspond to a host system (e.g., the host system 102 of FIG. 1) that includes, is coupled to, or utilizes a memory sub-system (e.g., the memory sub-system 103 of FIG. 1) or can be used to perform the operations of a controller (e.g., to execute an operating system to perform operations corresponding to bad block component 112 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 690 includes a processing device 692, a main memory 694 (e.g., read-only memory (ROM), flash memory, dynamic random access memory (DRAM) such as synchronous DRAM (SDRAM) or RDRAM, etc.), a static memory 698 (e.g., flash memory, static random access memory (SRAM), etc.), and a data storage system 699, which communicate with each other via a bus 697.

Processing device 692 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 692 can also be one or more special-purpose processing devices such as an application specific integrated circuit (ASIC), a field programmable gate array (FPGA), a digital signal processor (DSP), network processor, or the like. The processing device 692 is configured to execute instructions 693 for performing the operations and steps discussed herein. The computer system 690 can further include a network interface device 695 to communicate over the network 696.

The data storage system 699 can include a machine-readable storage medium 691 (also known as a computer-readable medium) on which is stored one or more sets of instructions 693 or software embodying any one or more of the methodologies or functions described herein. The instructions 693 can also reside, completely or at least partially, within the main memory 694 and/or within the processing device 692 during execution thereof by the computer system 690, the main memory 694 and the processing device 692 also constituting machine-readable storage media. The machine-readable storage medium 691, data storage system 699, and/or main memory 694 can correspond to the memory sub-system 103 of FIG. 1.

In one embodiment, the instructions 693 include instructions to implement functionality corresponding to bad block component 612 (e.g., bad block component 112 of FIG. 1). While the machine-readable storage medium 691 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

As used herein, the designators "N", "R", "S", and "B", particularly with respect to reference numerals in the drawings, indicates that a number of the particular feature so designated can be included with a number of embodiments of the present disclosure. Additionally, as used herein, "a", "an", or "a number of" can refer to one or more of something, and "a plurality of" can refer to more than one of such things. For example, a memory device can refer to one or more memory devices, and a plurality of memory devices can refer to two or more memory devices.

The figures herein follow a numbering convention in which the first digit or digits correspond to the drawing figure number and the remaining digits identify an element or component in the drawing. Similar elements or components between different figures may be identified by the use of similar digits. For example, 112 may reference element "12" in FIG. 1, and a similar element may be referenced as 612 in FIG. 6.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
a memory component having a plurality of dies, including a first die having a first block of memory cells designated as a first bad block; and
a processing device, included in the memory component, to:
identify, responsive to an error detection operation performed on placeholder data programmed to a number of pages of memory cells in the first bad block of the first die determining there are no errors in the placeholder data programmed to the number of pages of memory cells, the number of pages of memory cells as functional pages of memory cells in the first bad block of the first die;
program system data to the identified functional pages of memory cells in the first bad block of the first die;
if the number of pages of memory cells identified as functional pages of memory cells in the first bad block of the first die does not meet or exceed a particular number of pages:
identify, responsive to an error detection operation performed on placeholder data programmed to a number of pages of memory cells in a second block of memory cells of the first die designated as a second bad block determining there are no errors in the placeholder data programmed to the number of pages of memory cells in the second bad block of the first die, the number of pages of memory cells in the second bad block of the first die as functional pages of memory cells in the second bad block of the first die; and
program system data to the identified functional pages of memory cells in the second bad block of the first die; and
if the number of pages of memory cells identified as functional pages of memory cells in the first bad block of the first die meets or exceeds the particular number of pages:
identify, responsive to an error detection operation performed on placeholder data programmed to a number of pages of memory cells in a third block of memory cells of a second die of the memory component designated as a third bad block determining there are no errors in the placeholder data programmed to the number of pages of memory cells in the third bad block of the second die, the number of pages of memory cells in the third bad block of the second die as functional pages of memory cells in the third bad block of the second die; and
program system data to the identified functional pages of memory cells in the third bad block of the second die.

2. The system of claim 1, wherein the processing device is to sense the system data programmed to the identified functional pages of memory cells in the first bad block of the first die.

3. The system of claim 1, wherein the processing device is to identify the number of pages of memory cells in the first bad block of the first die as the functional pages of memory cells in the first bad block of the first die by:
programming the placeholder data to the number of pages of memory cells;
sensing the placeholder data;

performing the error detection operation on the sensed placeholder data to determine whether there are any errors in the sensed placeholder data; and identifying the number of pages of memory cells as the functional pages of memory cells responsive to the error detection operation determining there are no errors in the sensed placeholder data.

4. The system of claim 3, wherein the processing device is to identify the number of pages of memory cells as the functional pages of memory cells in the first bad block of the first die by:

programming additional placeholder data to the number of pages of memory cells in the first bad block, wherein the additional placeholder data is opposite the placeholder data;

sensing the additional placeholder data;

performing an additional error detection operation on the sensed additional placeholder data to determine whether there are any errors in the sensed additional placeholder data; and identifying the number of pages of memory cells as the functional pages of memory cells responsive to the additional error detection operation determining there are no errors in the sensed additional placeholder data.

5. The system of claim 1, wherein the processing device is to incorporate error correction code in the system data programmed to the identified functional pages of memory cells in the first bad block of the first die.

6. A method, comprising:

identifying, responsive to an error detection operation performed on placeholder data programmed to a number of pages of memory cells in a first block of memory cells in a first die of a memory component of a memory sub-system designated as a first bad block determining there are no errors in the placeholder data programmed to the number of pages of memory cells, the number of pages of memory cells as functional pages of memory cells in the first bad block of the first die;

storing system data in the identified functional pages of memory cells in the first bad block of the first die;

in response to determining the number of pages of memory cells identified as functional pages of memory cells in the first bad block of the first die does not meet or exceed a first particular number of pages:

identifying, responsive to an error detection operation performed on placeholder data programmed to a number of pages of memory cells in a second block of memory cells in the first die designated as a second bad block determining there are no errors in the placeholder data programmed to the number of pages of memory cells in the second bad block of the first die, the number of pages of memory cells in the second bad block of the first die as functional pages of memory cells in the second bad block of the first die; and programming system data to the identified functional pages of memory cells in the second bad block of the first die; and in response to determining the number of pages of memory cells identified as functional pages of memory cells in the first bad block of the first die meets or exceeds the first particular number of pages:

identifying, responsive to an error detection operation performed on placeholder data programmed to a number of pages of memory cells in a third block of memory cells in a second die of the memory component designated as a third bad block determining there are no errors in the placeholder data programmed to the number of pages of memory cells in the third bad block of the second die, the number of pages of memory cells in the third bad block of the second die as functional pages of memory cells in the third bad block of the second die; and programming system data to the identified functional pages of memory cells in the third bad block of the second die;

locating, in the first bad block of the first die, the identified functional pages of memory cells in the first bad block of the first die having the system data stored therein; and sensing the system data stored in the located pages of memory cells in the first bad block of the first die.

7. The method of claim 6, wherein locating the identified functional pages of memory cells in the first bad block of the first die having the system data stored therein comprises scanning the first bad block of the first die for a signature associated with the system data.

8. The method of claim 7, wherein scanning the first bad block of the first die for the signature associated with the system data comprises scanning each respective page of memory cells in the first bad block of the first die for the signature until a second particular number of pages having the signature have been located.

9. The method of claim 6, wherein the method further comprises performing an error correction operation on the sensed system data.

10. The method of claim 6, wherein the method further comprises:

locating, in the second bad block of the first die, the identified functional pages of memory cells in the second bad block of the first die having the system data stored therein; and sensing the system data stored in the located pages of memory cells in the second bad block of the first die.

11. A non-transitory computer-readable storage medium comprising instructions that, when executed by a processing device, cause the processing device to:

identify, responsive to an error detection operation performed on placeholder data programmed to a number of pages of memory cells in a first block of memory cells in a first die of a memory component of a memory sub-system designated as a first bad block determining there are no errors in the placeholder data programmed to the number of pages of memory cells, the number of pages of memory cells as functional pages of memory cells in the first bad block of the first die;

program system data to the identified functional pages of memory cells in the first bad block of the first die;

if the number of pages of memory cells identified as functional pages of memory cells in the first bad block of the first die does not meet or exceed a particular number of pages:

identify, responsive to an error detection operation performed on placeholder data programmed to a number of pages of memory cells in a second block of memory cells in the first die designated as a second bad block determining there are no errors in the placeholder data programmed to the number of pages of memory cells in the second bad block of the first die, the number of pages of memory cells in the second bad block of the first die as functional pages of memory cells in the second bad block of the first die; and program system data to the identified functional pages of memory cells in the second bad block of the first die; and if the number of pages of memory cells identified as functional pages of memory cells in the first bad block of the first die meets or exceeds the particular number of pages:

identify, responsive to an error detection operation performed on placeholder data programmed to a number of pages of memory cells in a third block of memory cells in a second die of the memory component designated as a third bad block determining there are no errors in the placeholder data programmed to the number of pages of memory cells in the third bad block of the second die, the number of pages of memory cells in the third bad block of the second die as functional pages of memory cells in the third bad block of the second die; and program system data to the identified functional pages of memory cells in the third bad block of the second die;

locate the identified functional pages of memory cells in the first bad block of the first die to which the system data has been programmed; and sense the system data upon locating the identified functional pages of memory cells in the first bad block of the first die.

12. The non-transitory computer-readable storage medium of claim 11, wherein the first block of memory cells in the first die is designated as a bad block during manufacture of the memory sub-system.

13. The non-transitory computer-readable storage medium of claim 11, wherein the system data comprises manufacturing data associated with the memory sub-system.

14. The non-transitory computer-readable storage medium of claim 11, wherein the instructions are further executable to cause the processing device to program user data to additional blocks of memory cells in the memory component.

15. The non-transitory computer-readable storage medium of claim 11, wherein the instructions are executable to cause the processing device to identify the number of pages of memory cells in the first bad block of the first die as functional pages of memory cells in the first bad block of the first die by:

programming the placeholder data to the number of pages of memory cells in the first bad block of the first die;

sensing the placeholder data programmed to the number of pages of memory cells in the first bad block of the first die;

performing the error detection operation on the sensed placeholder data programmed to the number of pages of memory cells in the first bad block of the first die to determine whether there are any errors in the sensed placeholder data; and identifying the number of pages of memory cells in the first bad block of the first die as functional pages of memory cells responsive to the error detection operation determining there are no errors in the sensed placeholder data programmed to the number of pages of memory cells.

16. The non-transitory computer-readable storage medium of claim 15, wherein the instructions are executable to cause the processing device to program the placeholder data, sense the placeholder data, perform the error detection operation, and identify the number of pages of memory cells as functional pages until the particular number of pages have been identified as functional.

17. The non-transitory computer-readable storage medium of claim 15, wherein the instructions are executable to:

identify the number of pages of memory cells in the first bad block of the first die as non-functional pages of memory cells responsive to the error detection operation determining there is an error in the sensed placeholder data programmed to the number of pages of memory cells.

* * * * *